Oct. 21, 1958     J. E. NITSCHE     2,857,501
ELECTRIC GLASS WORKING
Filed Jan. 27, 1956                           3 Sheets-Sheet 1

Inventor
JOSEPH E. NITSCHE
BY Clarence R. Patty, Jr
Attorney

Inventor
JOSEPH E. NITSCHE
BY Clarence R. Patty J.
Attorney

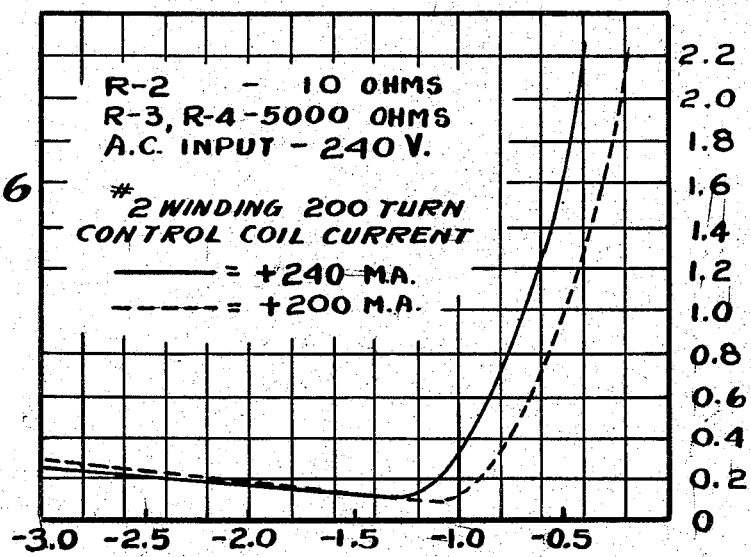
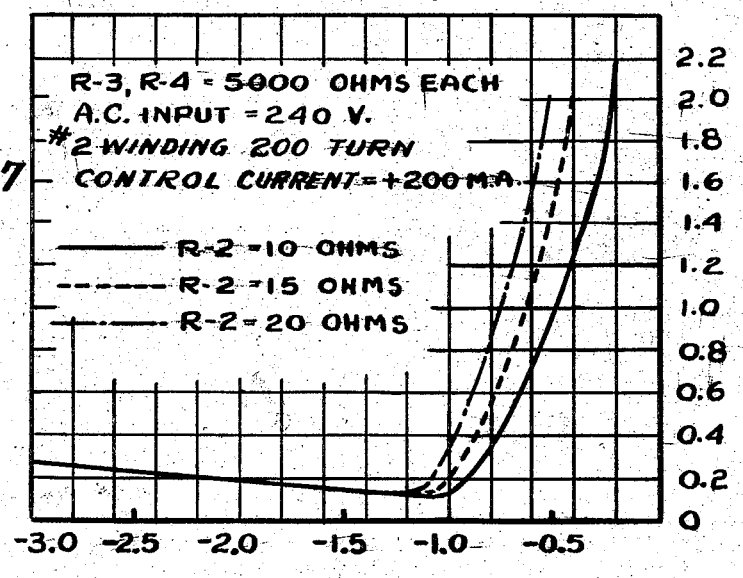

United States Patent Office 2,857,501
Patented Oct. 21, 1958

2,857,501

ELECTRIC GLASS WORKING

Joseph E. Nitsche, Corning, N. Y., assignor to Corning Glass Works, Corning, N. Y., a corporation of New York Application January 27, 1956, Serial No. 561,894

6 Claims. (Cl. 219—20)

The present invention relates to electric glass working and is primarily concerned with the automatic limitation of power input to values that practice has shown will produce the desired results without introducing defects into the work.

It is well understood that the glass resistance decreases, during an electric heating operation, as the temperature rises. Therefore, the voltage drop across the hot glass decreases and this decrease in voltage is reflected in the primary voltage of the power supply transformer which shows a corresponding decrease. If not counteracted, in the same way, this decrease in primary voltage drop would allow too much current to flow in the melting glass. This would produce still further decrease in glass resistance resulting in still higher current flow and thus lead to a runaway condition.

To prevent such a runaway condition from developing it has long been the practice to connect a ballast reactor in series with the power supply system. The voltage drop across this ballast reactor limits the current flowing in the glass to safe values.

While in the beginning of an operation only a narrow stripe is heated in the glass, as heating continues more and more glass is heated and melted requiring more and more electric heating current. This extra heating current is supplied, in practice, by decreasing the reactance, which is made variable for this purpose, thereby allowing the flow of larger heating current. The variable reactance used for this service is usually a saturable core reactor which decreases in reactance as its magnetic core is saturated to an increasing amount by a direct current control winding.

If the power is increased at a uniform rate inversely proportional to the decrease in the resistance of the glass within a predetermined lapsed time an operation can be efficiently performed manually. Operators, however, differ widely in their judgment of the amount of current that can be efficiently applied. If the current is fed too slowly, the elapsed time will be excessive and normal production will not be obtained. On the other hand, if the current is applied too rapidly, the glass will be heated to an excessive temperature and reboil will occur, resulting in the production of defective ware.

Although a skilled operator can expediently perform a high quality glass working operation, fatigue and eye strain with lapse of time reduce his ability to apply the power properly. The incentive pay system also often causes operators to apply the power too rapidly, resulting in the production of defective work.

According to the invention, a ballast reactor comprising a saturable reactor is also employed, but its control is made automatic by placing its control winding under the influence of feed back signals provided by changes in the primary voltage. Alternatively, changes in the primary current are also utilized as feed back signals. In a still further variation of the invention variations in the primary voltage and in the direct current saturating current are cooperatively utilized as feed back signals. In each form of the invention the feed back signals supplied to the control winding of the saturable reactor are amplified by a magnetic amplifier having one control winding supplied with feed back current in accordance with changes in the primary voltage.

In accordance with the first form of the invention a second control winding of the magnetic amplifier is fed from an independent current source under restricted manual control.

In accordance with the second form of the invention the second control winding is fed current from a current transformer in the power supply line, and is also under restricted manual control.

The third form of the invention differs from the second only in that the current is fed back to the second control winding from the terminals of a resistor connected in series with the control winding of the saturable reactor, rather than from a current transformer.

In any of the arrangements according to the invention irrespective of attempts on the part of the operator to speed up the glass working or sealing operation, the amount of power delivered to the work is restricted in accordance with the electrical resistance and/or conductivity of the glass being heated to the degree determined by the automatic feed back controls which are adjusted in accordance with past practice as safe for the production of good work.

For a better understanding of the invention reference is made in the following description and to the accompanying drawings wherein—

Fig. 1 shows a series of curves typical of a glass sealing cycle under manual power control.

Fig. 2 diagrammatically illustrates one preferred form of the invention.

Figs. 6 and 7 are curves in which are plotted the output current vs. control current of a magnetic amplifier such as that herein described.

Figure 1:
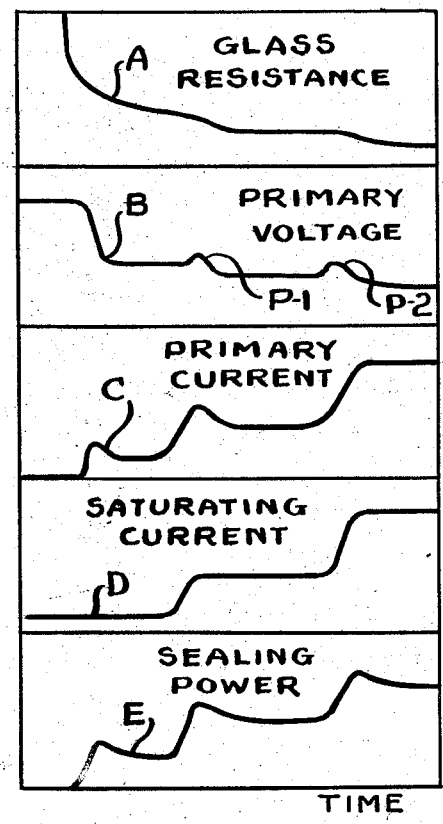

Referring now to the curves A and B in Fig. 1, it can be seen that both the glass resistance and the primary voltage gradually decrease as the heating operation progresses. The two peaks P1 and P2 in the primary voltage curve would not be there if the direct current saturating current, shown by curve D, had been increased more gradually as in the case of a typical automatic power control sealing cycle as illustrated in curve D1 of Fig. 5. Thus in the primary voltage we have a signal which is directly proportional to the glass resistance.

Figure 2:
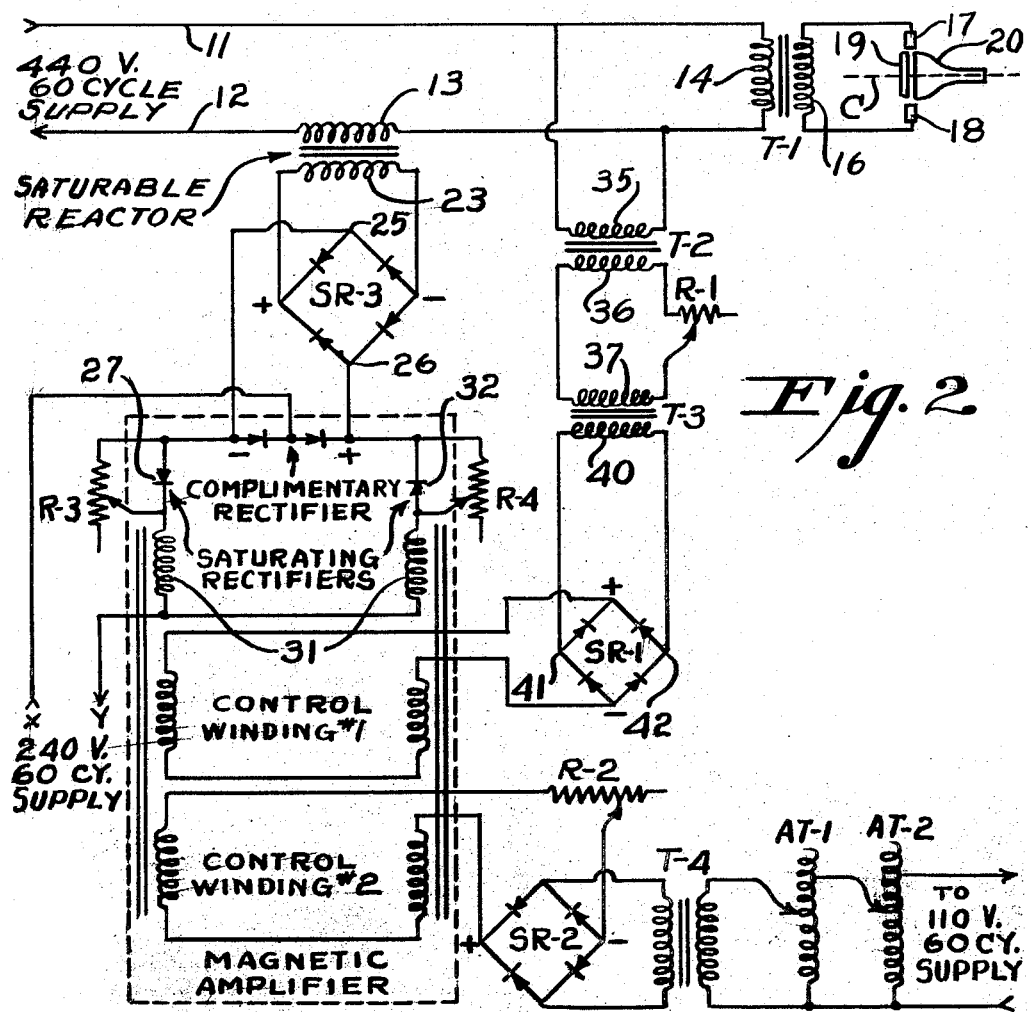

Referring to Fig. 2, sealing power is conveniently obtained from a 440 volt 60 cycle current source supplied to conductors 11 and 12 and passes through the alternating current winding 13 of a saturable reactor and the primary winding 14 of a glass melting and/or sealing transformer T-1 in series. The secondary winding 16 of the transformer T-1 is illustrated as connected to suitable electrodes 17 and 18 between which glass parts such as 19 and 20 are arranged and manipulated in a conventional fashion for sealing them to one another.

As previously pointed out, the amount of power available for heating the glass parts is controlled by the impedance of the saturable reactor. This impedance is regulated by variation of the saturating current supplied to the direct current winding 23. For example, the impedance is decreased by increasing the amount of direct current passed through winding 23. Direct current is supplied to the reactor winding 23 from the — and + terminals of an isolating rectifier SR-3, to whose input terminals 25 and 26 direct current is supplied by the magnetic amplifier from a 240 v. 60 cycle current supply connected via the associated magnetic amplifier. Such current supply circuit extends from an X terminal of such source, through a complementary rectifier alternately to terminals 25 and 26; and via terminal Y through the left half of the winding 31 of the magnetic amplifier, its saturating rectifier 27 and rheostat R-3 in parallel to the terminal 25, and alternately through the right half of winding 31, the saturating rectifier 32 and rheostat R-4 in parallel to terminal 26.

Connected in multiple with the transformer T-1 primary winding 14, is the primary winding 35 of a step down transformer T-2, whose secondary winding 36 is connected in series with a rheostat R-1 and the primary winding 37 of a step down transformer T-3. The secondary winding 40 of transformer T-3 is connected with the input terminals 41 and 42 of a rectifier SR-1 the + and − terminals of which are in turn connected to the control winding #1 of the magnetic amplifier.

The direct current control winding #2 of the magnetic amplifier serves to limit the value of current that can be supplied to the electrodes 17 and 18. Winding #2 is supplied with direct current from the + and − terminals of a rectifier SR-2 via a rheostat R-2. Rectifier SR-2 is supplied with current from a 110 volt 60 cycle current supply via a manually adjustable autotransformer AT-2, an adjustable autotransformer AT-1, and a step down transformer T-4.

The rheostat R-2 and the autotransformer AT-1 are adjusted to place a top limitation on the power output to the electrodes 17 and 18, in accordance with the particular character of the glass articles to be worked or sealed and are not available for adjustment by the operator. The adjustable transformer AT-2 can, of course, be used at the discretion of the operator to reduce the power input below the maximum automatically allowable in accordance with the glass temperature and/or conductivity.

Referring again to Fig. 1 it will be observed from curves A and B that both the glass resistance and the primary voltage are high at the beginning of a sealing cycle, at which time the glass is relatively cold. As the glass is heated by auxiliary means, such as by impingement of flames directed thereon, both the glass resistance and the primary voltage decrease and current starts to flow through the glass parts. As the glass temperature rises its resistance to current flow gradually decreases, the flow of sealing current increases and the primary voltage decreases. Comparing curve A with curve B it will be seen that the glass resistance curve is substantially the same as the primary voltage curve.

Figure 5:
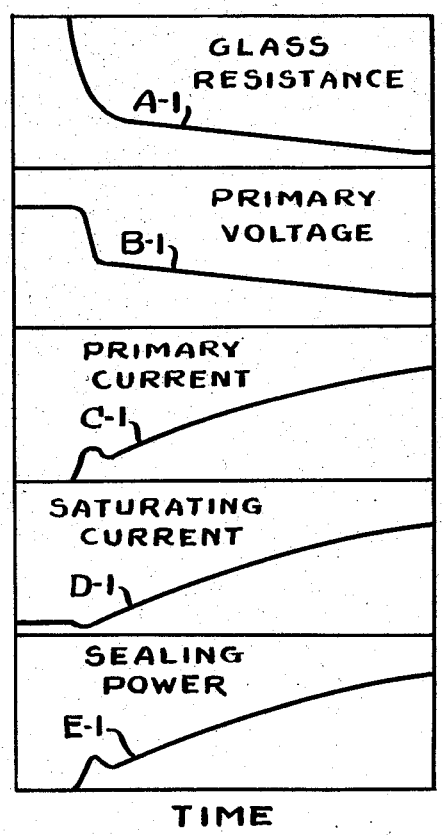
Fig. 5 shows a series of curves typical of a glass sealing cycle under automatic control.

Now by so regulating the primary (glass working) current that its flow is inversely proportional to the primary voltage as indicated by curves B and B1 of Fig. 1 and Fig. 5 then such current will also be proportional to the glass resistance, as indicated by curves A and A1.

By means of the step down transformer T-2, step down transformer T-3 and the rectifier SR-1, there is induced in control winding #1 of the magnetic amplifier a direct current which is proportional to the primary voltage. The glass resistance and the transformer T-2 primary voltage must decrease, however, to preset values before the primary current, as indicated in curve C1 is allowed to increase and is accomplished by means of the rheostat R-1. By making this direct current flow in the proper direction through control winding #1 the direct current output of the magnetic amplifier to the rectifier SR-3 and into the direct current winding 23 of the saturable reactor is made inversely proportional to the control current and also to the glass resistance.

The rectifier SR-3 serves to isolate the magnetic amplifier from the high inductance of the direct current winding 23 of the saturable reactor. The rheostats R-3 and R-4, conveniently comprising resistors of 5000 ohms each, serve to supply negative feed backs within the magnetic amplifier and are used in setting the gain of the amplifier. A low resistance gives much negative feed back and thus low gain. A high resistance gives little negative feed back and thus high gain.

The value of the sealing current delivered is thus in part controlled in accordance with value of the direct current flowing in the magnetic amplifier winding #2. The value of such direct current is made adjustable by means of the autotransformer AT-1 and the rheostat R-2, both of which are made inaccessible to the operator. The operator may, however, reduce the maximum possible power input at will by means of the adjustable autotransformer AT-2.

Figure 3:
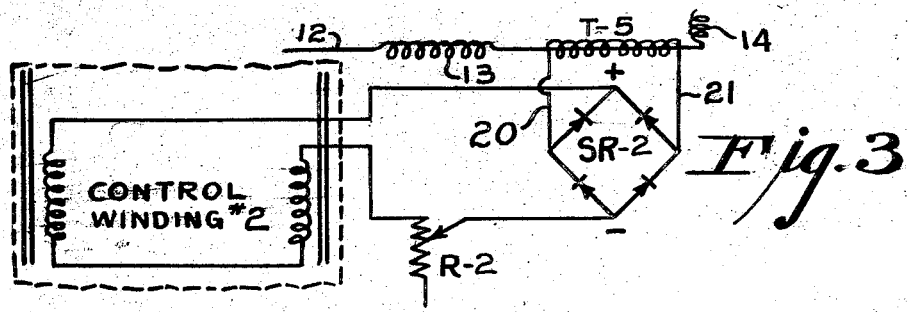
Fig. 3 shows parts of Fig. 2 as modified in accordance with the second form of the invention.

In the first alternative form of the invention, illustrated in Fig. 3, the rectifier SR-2 instead of being supplied with current from an independent source via the secondary of a transformer such as T-4 is supplied by a current transformer T-5 whose primary is connected in series with the winding 13 of the saturable reactor and the transformer primary winding 14.

Figure 4:
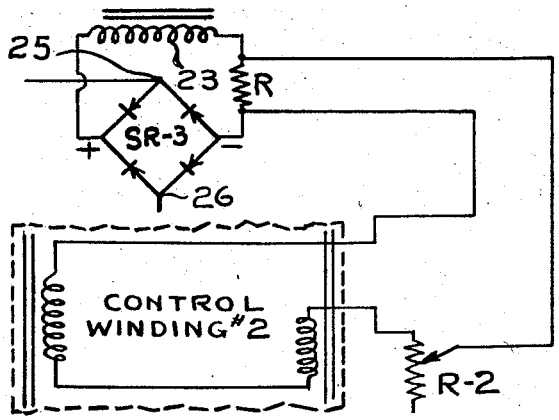
Fig. 4 shows parts of Fig. 2 as modified in accordance with the third form of the invention.

In the second alternative form of the invention, illustrated in Fig. 4 the #2 control winding instead of receiving direct current from a rectifier such as SR-2 receives direct current from the terminals of a fixed resistor R connected in series with the control winding 23 of the saturable reactor, thus dispensing with need for either a rectifier such as SR-2 or the current transformer T-5.

Since in actual practice in any of the above forms of the invention the operator cannot take any action to accelerate the power input to electrodes 17 and 18 beyond the optimum automatically provided he rarely takes steps to restrict the operation. As will be understood, the work, such as parts 19 and 20 arranged between the electrodes 17 and 18, is usually rotated about a center C midway therebetween, and also that in instances where the work is non-circular, commonly used facilities are provided for maintaining the electrodes uniformly spaced from the work as it rotates. Alternatively electrodes 17 and 18 may comprise one pair of a group of pairs thereof selectively connected to the terminals of winding 16 by suitable switching equipment in accordance with prior known practice, as taught for example by Patent No. 2,389,360.

One form of magnetic amplifier suitable for use in practicing the invention has a #1 control winding of 50 turns and a #2 control winding of 200 turns and is shown and/or described in Bulletins 20B and 2700, distributed by Vickers Inc., 1815 Locust Street, St. Louis 3, Missouri. The operation of such a magnetic amplifier in applicant's system can best be understood by referring to Figs. 6 and 7 and the Table I below:

*Table I*

| Glass Resistance, Ohms | Primary Voltage | Control Current, Amperes | Saturating Current, Amperes | Sealing Current, Amperes | Sealing Power, kw. |
|---|---|---|---|---|---|
| Over 500,000 | 440 | −3.0 | 0.25 | 0 | 0 |
| 20,000 | 200 | −1.0 | 0.13 | 10 | 2.0 |
| 1,000 | 100 | −0.2 | 2.2 | 100 | 10.0 |

The above table illustrates how the control current, saturating current, sealing current and sealing power change with changes in the glass resistance. As can be seen from the curves shown in Fig. 6 the saturating current varies with the control current, as indicated in Table I. The glass working operation is simply a matter of advancing along a selected curve such as the 200 ma. curve starting with the control current −3.0 amperes and ending at −0.2 amperes. It should be noted from the Table I that while the primary voltage changes by a factor of 4.4, the control current changes by a factor of 15. This is due to the non-linearity of the rectifier SR-1. A still further change could be obtained by inserting a varistor in series with the #1 control winding.

The control windings #1 and #2 are of low impedance and thus there is some interaction between these windings. Rheostat R-2 may be an adjustable 50 ohm resistor utilized to control this interaction. The effect of changing the setting of R-2 is illustrated by the curve shown in Fig. 7. Less interaction is obtained with a higher value R-2 and the curve is more linear. However, a non-linear characteristic is desired in this instance because the saturable reactor does not have a linear characteristic and R-2 is normally set at 10 to 15 ohms. A comparison of curves A through E of Fig. 1 with the corresponding curves A1 through E1 of Fig. 5 clearly shows the advantages of the invention over manual power control.

What is claimed is:

1. In a glass working apparatus, a glass working current supply transformer, glass working electrodes connected to the secondary winding of said transformer, a saturable reactor, a circuit extending from a current supply source including the primary winding of said transformer and the alternating current winding of said saturable reactor in series, a magnetic amplifier, output leads extending from said magnetic amplifier and feeding direct current to the direct current winding of said saturable reactor, means connected in parallel with the primary winding of said transformer for feeding direct current to a control winding of said amplifier, and means for supplying direct current from an isolated source to a second control winding of said amplifier.

2. In a glass working apparatus, a glass working current supply transformer, glass working electrodes connected to the secondary winding of said transformer, a saturable reactor, a circuit extending from a current supply source including the primary winding of said transformer and the alternating current winding of said saturable reactor in series, a magnetic amplifier, output leads extending from said magnetic amplifier and feeding direct current to the direct current winding of said saturable reactor, means connected in parallel with the primary winding of said transformer for feeding direct current to a control winding of said amplifier, a current transformer included in circuit with the primary winding of the first transformer and a rectifier for supplying direct current to a second control winding of said amplifier.

3. In an electric glass working apparatus, a saturable reactor, a high voltage glass working transformer, a glass working current supply circuit in which the alternating current winding of said reactor and the primary winding of said transformer are included in series, a magnetic amplifier embodying a control winding and a second winding with associated rectifiers having leads for supplying direct current to the direct current winding of said saturable reactor, an isolating rectifier interposed between said leads and such reactor winding, means for supplying current to the latter rectifier via rectifiers of said amplifier and via the second winding of said amplifier and other of the rectifiers associated with such winding, a rectifier having its output terminals connected to the terminals of said control winding, a second transformer whose secondary winding is connected to the input terminals of the latter rectifier, a third transformer having its primary winding connected in multiple with the primary winding of said glass working transformer, and a circuit including the secondary winding of said third transformer the primary winding of said second transformer and a rheostat in series.

4. An apparatus such as defined by claim 3 wherein said amplifier includes another control winding, a rectifier to the output terminals of which the terminals of the latter winding are connected, another transformer having its secondary winding terminals connected to the input terminals of the latter rectifier, an autotransformer connected across the primary winding of the latter transformer and a further autotransformer connected to the former autotransformer and to a control current source respectively.

5. An apparatus such as defined by claim 3 wherein said amplifier includes another control winding, a rectifier to the output terminals of which the terminals of the latter winding are connected, and a current transformer associated with the glass working supply circuit and having its output terminals connected to the input terminals of the latter rectifier.

6. An apparatus such as defined by claim 3 which includes a circuit comprising another control winding of the amplifier, a rheostat and a resistor in series, said resistor being also connected in series with the direct current winding of said saturable reactor.

References Cited in the file of this patent

UNITED STATES PATENTS

| | | |
|---|---|---|
| 2,086,120 | Croden | July 6, 1937 |
| 2,306,054 | Guyer | Dec. 22, 1942 |
| 2,314,956 | Slayter et al. | Mar. 30, 1943 |
| 2,516,570 | Hartwig et al. | July 25, 1950 |
| 2,706,764 | Mitchell | Apr. 19, 1955 |

OTHER REFERENCES

Ogle: General Electric Review, vol. 53, No. 10, pp. 41–46, October 1950; vol. 53, No. 2, 32–35, February 1950.